United States Patent
Huang et al.

(10) Patent No.: US 7,457,936 B2
(45) Date of Patent: Nov. 25, 2008

(54) MEMORY ACCESS INSTRUCTION VECTORIZATION

(75) Inventors: Bo Huang, Shanghai (CN); Long (Paul) Li, Shanghai (CN); Jinquan (Jason) Dai, Shanghai (CN); Luddy (Williams) Harrison, Chestnut, MA (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 10/718,283

(22) Filed: Nov. 19, 2003

(65) Prior Publication Data

US 2005/0108499 A1    May 19, 2005

(51) Int. Cl.
*G06F 12/00* (2006.01)

(52) U.S. Cl. .................. 711/217; 712/E9.082

(58) Field of Classification Search .................. 711/217
See application file for complete search history.

(56) References Cited

U.S. PATENT DOCUMENTS

| | | |
|---|---|---|
| 5,850,551 A | 12/1998 | Takayama et al. |
| 6,099,585 A | 8/2000 | Godfrey |
| 6,286,134 B1 | 9/2001 | Click, Jr. et al. |
| 6,292,938 B1 * | 9/2001 | Sarkar et al. ............... 717/138 |
| 6,334,171 B1 * | 12/2001 | Hill et al. .................. 711/138 |
| 6,356,270 B2 * | 3/2002 | Pentkovski et al. ......... 345/530 |
| 6,434,639 B1 * | 8/2002 | Haghighi .................... 710/39 |

(Continued)

FOREIGN PATENT DOCUMENTS

| | | |
|---|---|---|
| EP | 0 609 903 A | 8/1994 |
| EP | 0 742 518 A2 | 11/1996 |
| WO | WO 00/22513 | 4/2000 |

OTHER PUBLICATIONS

Microsoft Press Dictionary, 1997, Microsoft Press, 3rd ed., pp. 166, 170, 332.421.*

(Continued)

*Primary Examiner*—Matt Kim
*Assistant Examiner*—Ryan Dare
(74) *Attorney, Agent, or Firm*—Fish & Richardson P.C.

(57) ABSTRACT

A compilation method includes converting memory access instructions that read or write less than a minimum data access unit (MDAU) to memory access instructions that read or write a multiple of the minimum data access unit, converting the memory access instructions into a format including a base address plus an offset, grouping subsets of the converted memory access instructions into partitions, and vectorizing the converted memory access instructions in the subsets that match instruction patterns.

29 Claims, 5 Drawing Sheets

U.S. PATENT DOCUMENTS

| | | | |
|---|---|---|---|
| 6,496,905 B1 * | 12/2002 | Yoshioka et al. | 711/154 |
| 6,571,319 B2 * | 5/2003 | Tremblay et al. | 711/140 |
| 6,681,311 B2 * | 1/2004 | Gaskins et al. | 711/203 |
| 7,085,887 B2 * | 8/2006 | Gaither | 711/127 |
| 2002/0169921 A1 * | 11/2002 | Saitoh | 711/5 |
| 2002/0184460 A1 * | 12/2002 | Tremblay et al. | 711/167 |
| 2003/0061531 A1 * | 3/2003 | Fletcher et al. | 714/7 |
| 2003/0217223 A1 * | 11/2003 | Nino et al. | 711/105 |
| 2004/0006667 A1 * | 1/2004 | Bik et al. | 711/100 |
| 2004/0088503 A1 * | 5/2004 | Miyachi et al. | 711/157 |
| 2004/0158677 A1 * | 8/2004 | Dodd | 711/118 |
| 2005/0044326 A1 * | 2/2005 | Gaither | 711/140 |
| 2005/0097301 A1 * | 5/2005 | Ben-David et al. | 712/22 |

OTHER PUBLICATIONS

Microsoft Computer Dictionary, 2002, Microsoft Press, Fifth Edition, pp. 182, 186, 216, 371, 466.*

International Search Report, dated Feb. 5, 2004 issued by the ISA/CN in corresponding International Application Serial No. PCT/CN03/00989.

Bik et al., "Automatic Intra-Register Vectorization for the Intel Architecture", International Journal of Parallel Programming 30(2):65-98, Apr. 2002.

* cited by examiner

302 — [(read[SRAM] reg1, BaseAddrReg + 0):instantiable
304 — (read[SRAM] reg2, BaseAddrReg + 4):instantiable
306 — ]{condition: RegClass(reg1)=RegClass(reg2); PhysicalReg(reg2)=PhysicalReg(reg1)+1}

FIG. 5

MEMORY ACCESS INSTRUCTION VECTORIZATION

TECHNICAL FIELD

This description relates to memory access instruction vectorization.

BACKGROUND

Memory access instruction vectorization is usually used when program source code is compiled into object code or assembly code. Vectorization can also be used in the optimizer of an assembler. During compilation, memory access instruction vectorization combines two or more memory access instructions into a single memory access instruction to increase memory bandwidth. As a result, fewer memory accesses are required during program execution, which boosts performance of computing devices that have long memory access latency.

DESCRIPTION OF DRAWINGS

FIG. 5 is a block diagram.

DETAILED DESCRIPTION

Figure 1:
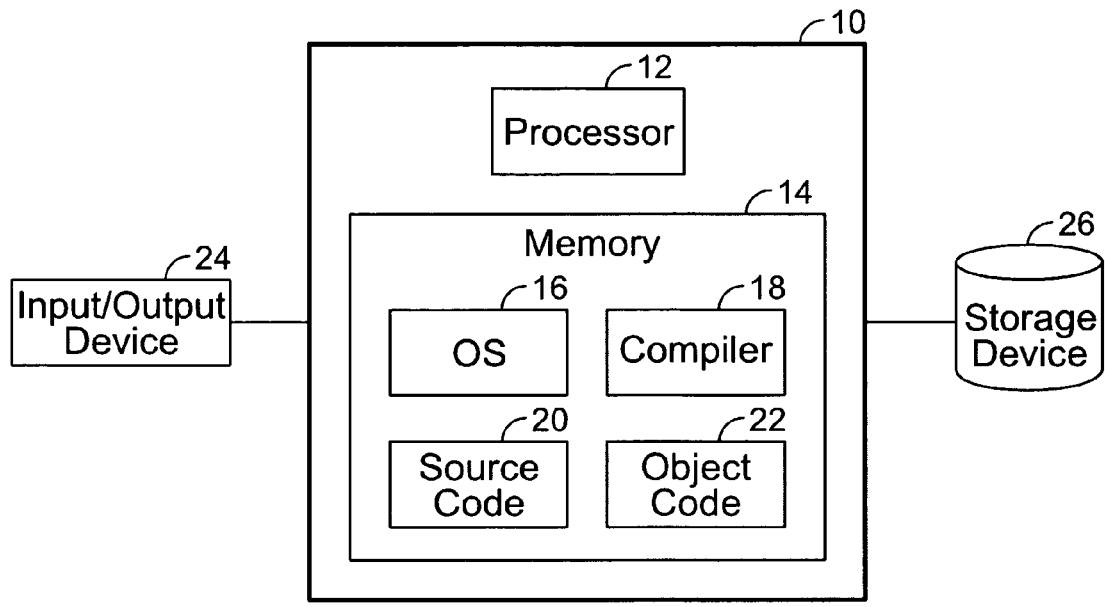
FIG. 1 is a block diagram.

As shown in FIG. 1, an exemplary system 10 includes a processor 12 and a memory 14. Memory 14 includes an operating system 16, a compiler 18, source code 20 and object code 22. In some embodiments, compilation and execution are not combined in a single system. In such embodiments, source code is compiled into an object file(s) in a first system, while the execution of the linked object file(s) occurs in a second system. In one example, the compiler 18 reads source code in a source code file on a storage device, such as a hard disk. The system 10 can include an input/output device 24 and a storage device 26. Examples of a computer-readable medium include memory and storage as discussed above.

The processor 12 executes instructions contained in the object code 22. The instructions can include memory access instructions such as instructions to read from the memory 14 and instructions to write to the memory 14. In some computer architectures, a memory access instruction has the capability of accessing a selectable numbers of bytes. Memory 14 is typically organized in a logical manner in which a location in memory that data is stored is represented by a number referred to as an address. Memory 14 can be thought of as an array of storage boxes, each of which is one byte in length. Each box has an address (a unique number) assigned to it. By specifying a memory address, programmers can access a particular byte of data.

Memory 14 can be of different types or banks. For example, memory 14 can include a static random access memory (SRAM) bank, a dynamic random access memory (DRAM) bank and a scratchpad memory bank. Memory 14 may also include an electrically programmable read-only memory (EEPROM) bank, a non-volatile random access (NVRAM) bank, and a flash memory bank. Since memory accesses to different memory banks are independent of each other, memory access vectorization can be independently performed with respect to memory access instructions that are directed to a particular memory bank.

Each memory access instruction complies with an instruction format. The instruction format includes the type of memory access (e.g., read or write), a memory bank to read or write information, a start address where the access is to begin, and the number of bytes to process. The number of bytes processed can vary with the type of memory (e.g., SRAM, DRAM, scratchpad, and so forth) and the operation to be performed (e.g., read, write). A minimum number of bytes that a memory access instruction uses to read or write is referred to as a minimum data access unit (MDAU).

Once a memory access has begun, the processor 12 waits for the access to be completed. The compiler 18 reduces processor 12 wait times by combining two or more memory access instructions contained in the source code 20 to a single equivalent vectorized memory access instruction.

Figure 2:
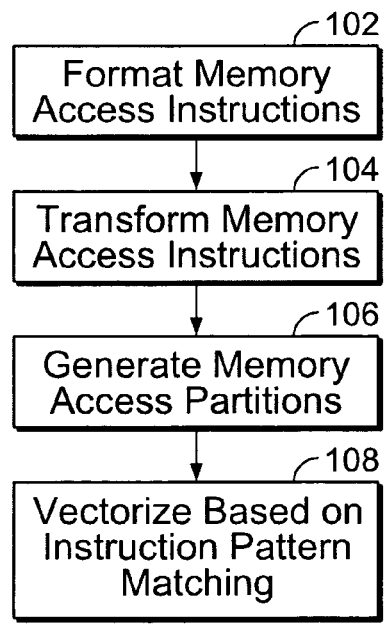
FIG. 2 is a flow diagram.

As shown in FIG. 2, the compiler 18 makes multiple passes through the source code 20, and vectorizes memory accesses using instruction pattern matching. In a formatting pass (102), the compiler 18 formats each memory access read instruction that provides for reading fewer than MDAU bytes to a read instruction that accesses MDAU bytes. For example, if the MDAU is 4 bytes and an encountered memory read instruction reads 2 bytes, the encountered memory read instruction is formatted to read 4 bytes. Similarly, a memory access write instruction that writes fewer than MDAU bytes is formatted by the compiler 18 to become a partial write instruction of MDAU bytes.

In a subsequent pass, the compiler 18 transforms (104) as many formatted memory access instructions as possible to a standard format in which the memory address reference is in the form of base address plus offset, where base address is an address that serves as a reference point for other addresses. For example, a base address can indicate the beginning of a program. The address of every instruction in the program can then be specified by adding an offset to the base address. Transforming a memory access instruction to the form of base address plus offset facilitates memory access vectorization by making it easier to combine several memory accesses together.

After the pass of transforming memory access instructions the compiler 18 generates (106) memory access partitions for each set of memory reads or memory writes to a particular memory bank based on a data flow graph. A memory access partition contains groups of memory access instructions inside one basic block. All memory access instructions inside a group (also called subnode of a memory access partition) perform the same memory access (write or read) to the same memory bank. The compiler 18 vectorizes (108) multiple memory access instructions based on instruction pattern matching performed for each group (subnode) of each memory access partition.

Figure 3:
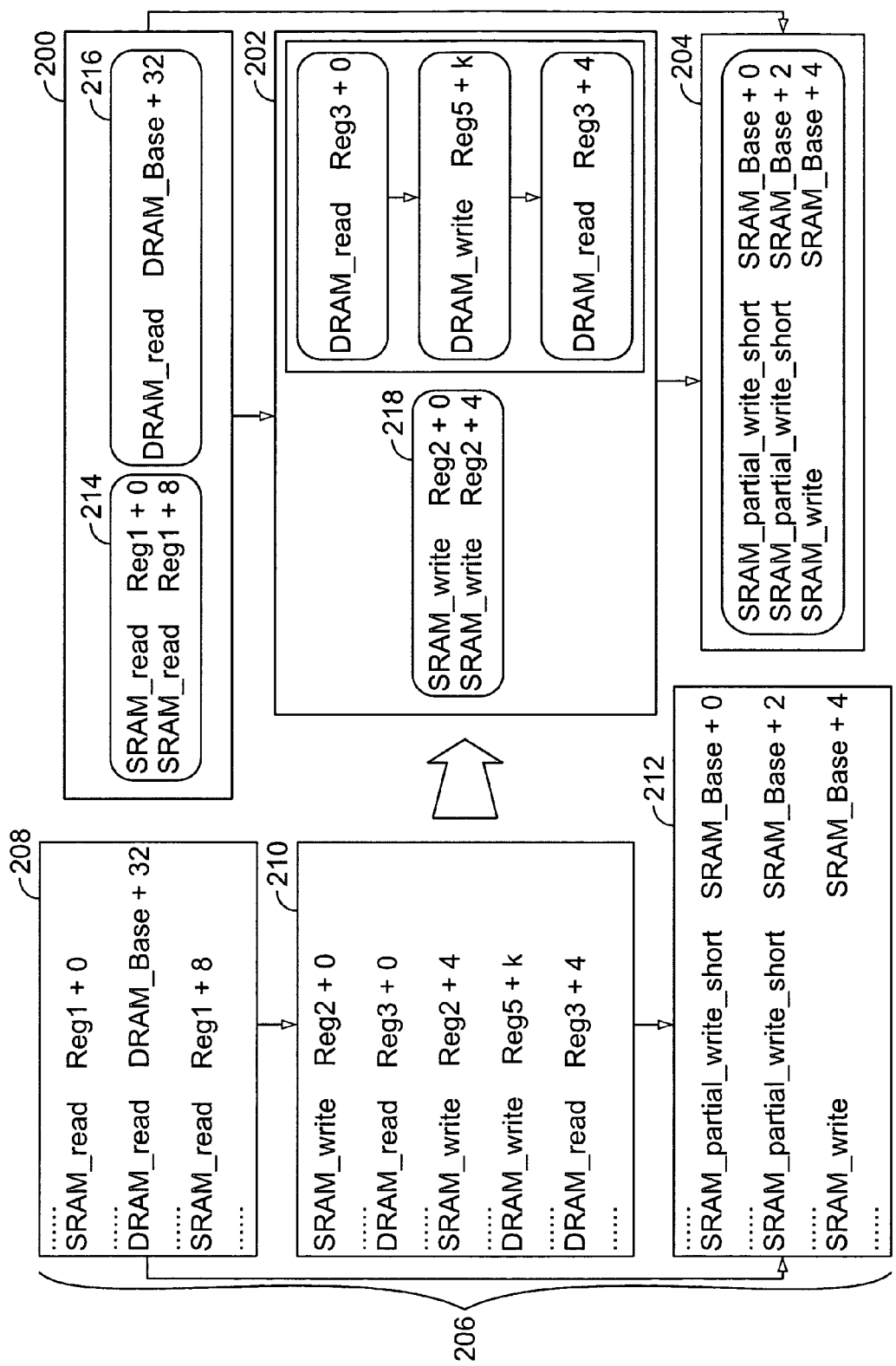
FIG. 3 is a memory diagram.

As shown in FIG. 3, a set of rules are used to generate (106) memory access partitions, such as memory access partitions 200, 202, 204. A data flow graph 206 is generated. In this example, the data flow graph 206 includes three basic blocks 208, 210, 212. Each of the basic blocks 208, 210, 212 include memory access instructions.

For each basic block 208, 210, 212, in the data flow graph 206, the following principles are applied to generate the corresponding memory access partition 200, 202, 204, respectively. Each subnode of a partition contains only memory access operations to a specific memory bank. For example, subnode 214 includes reads to a SRAM memory bank. Subnode 216 includes a read to a DRAM memory bank.

If a partition does not contain any memory access operations then the partition is an empty partition, which can be ignored in the following instruction pattern matching.

Each subnode contains only memory reads or memory writes, but cannot contain both memory reads and memory writes. For example, subnode 214 of partition 200 contains only memory reads. Subnode 218 of partition 202 contains only memory writes. If dependence exists between two memory access instructions, they are not placed into the same subnode.

One basic block in the data flow graph 206 corresponds to one memory access partition, while each memory access partition can include one or more subnodes. For example, basic block 208 corresponds to memory access partition 200, which includes subnodes 214, 216.

We describe the compiler 18 using an MDAU of four, although other MDAU values can be used.

Figure 4:
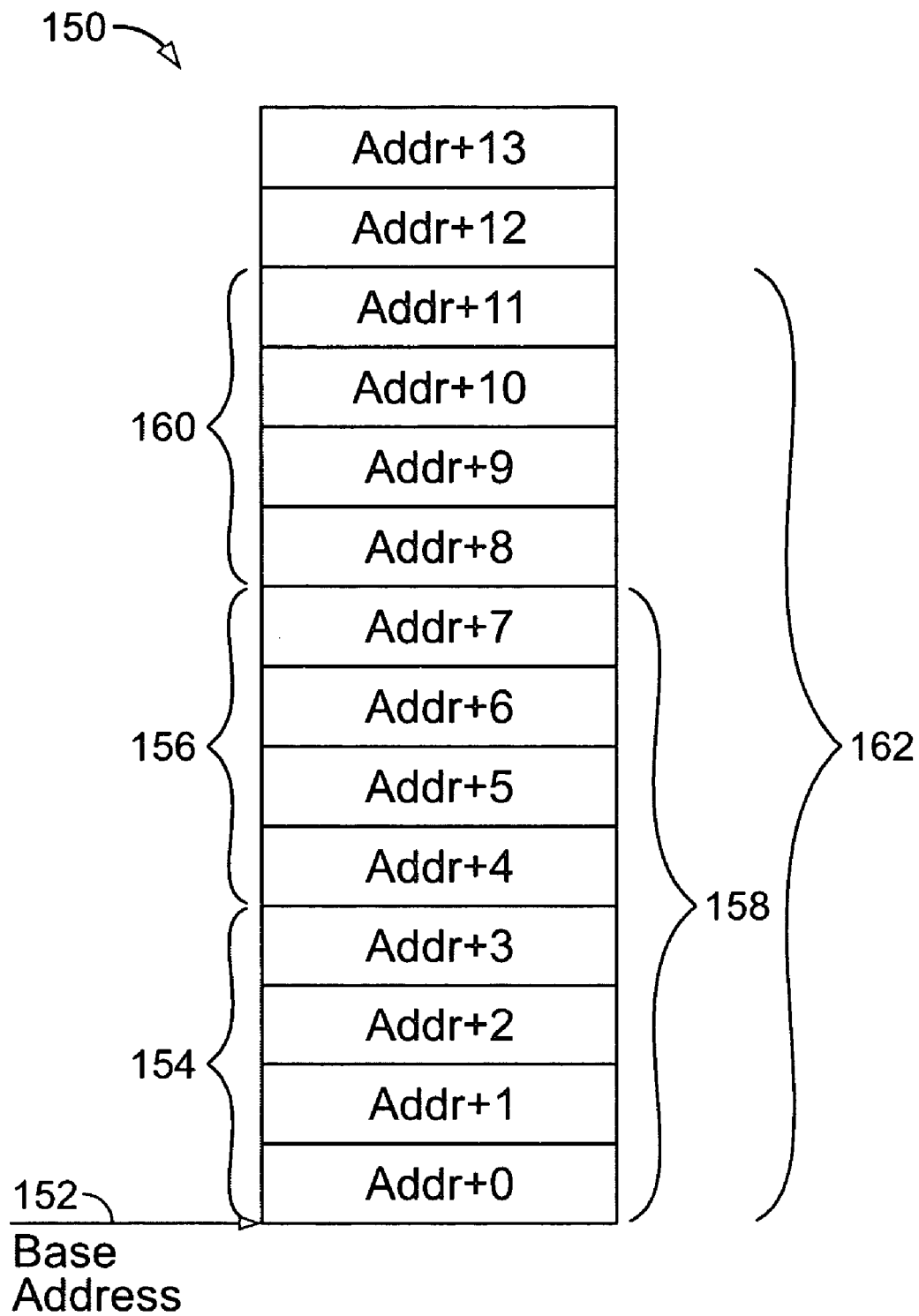
FIG. 4 is a source code listing.

As shown in FIG. 4, a memory diagram 150 is used to illustrate a vectorization of combining two SRAM reads into one SRAM read. The memory diagram 150 includes 14 SRAM memory locations represented by Addr+0 through Addr+13. In this example, Addr+0 is considered to be the base address 152. A first SRAM read instruction 154 is parsed to read 4 bytes starting at byte Addr+0, that is, data contained in bytes Addr+0, Addr+1, Addr+2 and Addr+3. A second SRAM read instruction 156 is parsed to read 4 bytes starting at byte Addr+4, that is data contained in bytes Addr+4, Addr+5, Addr+6 and Addr+7. Vectorizing these two SRAM reads generates a single vectorized SRAM read instruction 158 that is parsed to read 8 bytes starting at byte Addr+0, that is data contained in bytes Addr+0, Addr+1, Addr+2, Addr+3, Addr+4, Addr+5, Addr+6 and Addr+7.

Vectorizing two or more memory reads (or two or more memory writes) does not require that the read (or write) addresses be continuous. For example, a first SRAM read instruction 154 that would read 4 bytes starting at byte Addr+0 and a second SRAM read instruction 160 reads 4 bytes starting at byte Addr+8 can be vectorized into a single vectorized SRAM read instruction 162 that would read 12 bytes starting at byte Addr+0 and including byte Addr+11. Although 4 bytes, Addr+4, Addr+5, Addr+6 and Addr+7 are not used, it still saves time to perform one memory read to fetch the 12 bytes rather than two memory reads to fetch 4 bytes each. The memory read to four unused bytes Addr+4, Addr+5, Addr+6, Addr+7 are referred to as an instantiable memory read.

With memory access partitions such as a partition 200, 202, 204 it is convenient to perform memory access vectorization using instruction pattern matching. For each memory access instruction and instruction variance that is permitted in the source code language's definitions, an instruction pattern can be generated to describe the instruction semantics. The compiler 18 includes a store of all the instruction patterns. For example, as shown in FIG. 5, an instruction pattern 300 describes the SRAM memory read with a vectorization degree of 2, i.e., one that reads 2*MDAU bytes from SRAM.

The instruction pattern 300 indicates that two SRAM reads can form a single vectorized SRAM read instruction with vectorization degree of two. The instruction pattern 300 includes two semantic clauses 302, 304, also referred to as segments. The instruction pattern 300 is referred to as a two-segment pattern.

If the instruction pattern 300 is matched with the two SRAM read instructions appearing in an input program, pattern matching is successful, i.e., if two successive instructions in the source code comply with the semantics required by the two segments. As a result of the successful pattern match, it is required that the target symbolic registers of those two fragments, Reg1 and Reg2, be assigned with registers in the same register class and the physical register number should be contiguous, which is specified in a condition part 306 of the instruction pattern 300.

A successful instruction pattern matching does not always require all segments match. For the instruction pattern 300, if only one segment is matched the matching is successful because the property of the other segment is instantiable. Sometimes this kind of segment instantiation is useful. For example, for the two SRAM reads that appear in subnode 214 of partition 200, it is more profitable to get the combination of "SRAM-read Reg1+0" and "SRAM_read Reg1+8" matched with a three-fragment pattern instead of matching them respectively with a one-fragment pattern. Although the instantiation of "SRAM_read Reg1+4" is required, one memory access is always cheaper than two memory accesses. It is also worth noting that segments of memory writes cannot be instantiated.

Instruction pattern matching is performed by the compiler 18 for each subnode of each partition against every instruction pattern in the store. Since each subnode is either a READ or a WRITE, the instruction pattern matching for a subnode can be performed only using either READ patterns or WRITE patterns. To facilitate the description of the pattern-matching, we call those instruction patterns that have the following two properties as "legal pattern candidates"

1—access the same memory bank as the subnodes

2—describe the same memory operation (READ or WRITE) as the memory operation property of the subnodes For a specific subnode, pattern matching against all legal pattern candidates is done for all combinations of different memory operations inside that subnode.

All successful matches are recorded and then optimized matches are selected to generate a final match set of pattern matches. The following principles are used to select optimized matches:

(1) The final match set contains the minimum number of matches that cover all memory operations in the node.

(2) Each memory operation that appears in the node can only appear in one match that belongs to the final match set.

(3) If two pattern matches contain the same number of matched fragments, the match that has fewer instantiated fragments is chosen.

If all matches in the final match set are one fragment matches, no opportunity for memory vectorization has been identified.

In the memory access pattern design, all one-fragment patterns and partial write patterns are included, which guarantees that a final match can always be formed.

With the final match set, the compiled program can be transformed to form the vectorized memory accesses.

Some instruction patterns are designed specially for vectorizing partial writes. For a subnode that contains a partial write, the pattern matching for all partial writes inside that subnode is performed first, trying to combine several partial-writes together to form a write of MDAU bytes. If the partial write vectorization succeeds, the subnode should be updated to form the write of MDAU bytes from those matched partial-writes. Partial-write vectorization enlarges the opportunities of the latter memory access vectorization.

Figure 6:
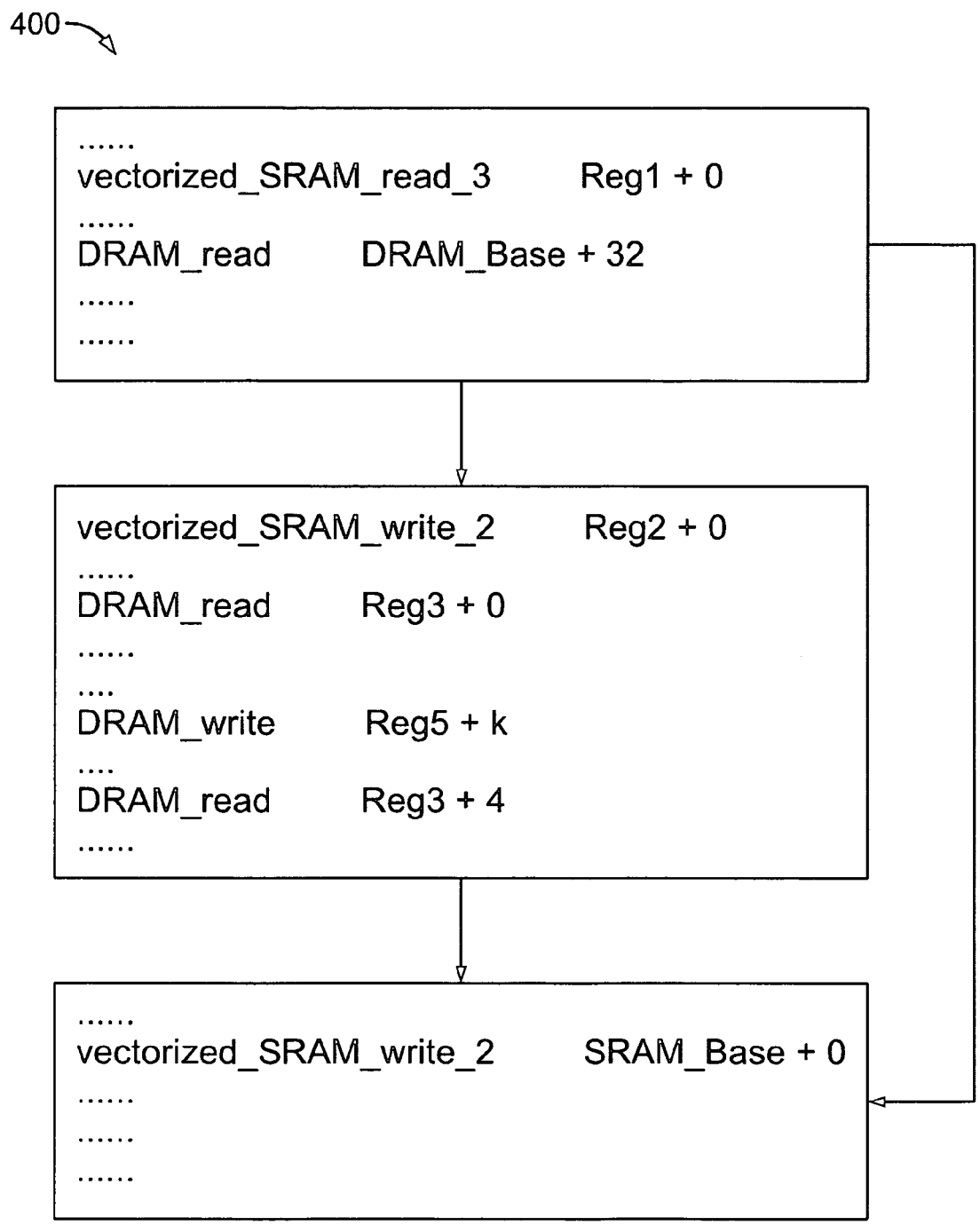
FIG. 6 is an instruction pattern.

A vectorization result 400 of the partitions 200, 202, 204 of FIG. 3 is shown in FIG. 6.

Other embodiments are within the scope of the following claims.

What is claimed is:

1. A method comprising:
   converting memory access instructions in a source code into intermediary standard formatted memory access instructions;
   generating a plurality of memory access partitions containing corresponding subsets of the intermediary standard formatted memory access instructions, with the plurality of memory access partitions directed to specific memory banks;
   identifying matching instructions based on comparisons of pre-defined instruction patterns to the intermediary standard formatted memory access instructions in the plurality of memory access partitions; and
   transforming the identified matching instructions to vector memory access instructions, with the transformed vector memory access instructions, when executed, causing a corresponding memory access operation to be performed for a group of memory locations.

2. The method of claim 1 in which converting comprises converting memory access instructions that read or write less than a minimum data access unit (MDAU) to memory access instructions that read or write a multiple of the minimum data access unit.

3. The method of claim 2 in which converting further comprises transforming the memory access instructions that read or write the multiple of the minimum data access unit to a format including a base address plus an offset.

4. The method of claim 1 in which generating the plurality of memory access partitions comprises:
   generating a data flow graph containing basic blocks including the intermediary standard formatted memory access instructions; and
   for each basic block, applying a set of rules.

5. The method of claim 4 in which applying comprises limiting a subnode of one of the plurality of memory access partitions to a memory read or a memory write.

6. The method of claim 1 in which the memory banks include a static random access memory (SRAM).

7. The method of claim 1 in which the memory banks include a dynamic random access memory (DRAM).

8. The method of claim 1 in which the memory banks include a scratchpad memory.

9. The method of claim 1 in which the memory banks include an EEPROM.

10. The method of claim 1 in which the memory banks include flash memory.

11. The method of claim 1 in which the memory banks include a NVRAM.

12. The method of claim 1 in which the instruction patterns comprise a pattern describing instruction semantics.

13. The method of claim 1 in which the vector memory access instructions comprise single memory access instructions representing multiple memory accesses to a type of memory.

14. A compilation method comprising:
   converting source code that includes memory access instructions that read or write less than a minimum data access unit (MDAU) to intermediary code that includes memory access instructions that read or write a multiple of the minimum data access unit;
   converting the memory access instructions of the intermediary code into intermediary memory access instructions that have a format including a base address plus an offset;
   grouping subsets of the intermediary memory access instructions into a plurality of memory access partitions, with the plurality of memory access partitions containing intermediate memory access instructions directed to specific memory banks; and
   transforming the intermediary memory access instructions in the subsets corresponding to the plurality of memory access partitions that match pre-defined instruction patterns to vector memory access instructions, with the transformed vector memory access instructions, when executed, causing a corresponding memory access operation to be performed for a group of memory locations.

15. The compilation method of claim 14 in which grouping comprises:
   generating a data flow graph containing basic blocks including intermediary memory access instructions; and
   generating subnodes in the plurality of the memory access partitions, each subnode including intermediary memory access instructions directed to the same operation in a memory bank corresponding to the respective memory access partition.

16. The compilation method of claim 15 in which the operation is a read.

17. The compilation method of claim 15 in which the operation is a write.

18. The compilation method of claim 15 in which the memory bank is a static random access memory (SRAM).

19. The compilation method of claim 15 in which the memory bank is a dynamic random access memory (DRAM).

20. The compilation method of claim 15 in which the memory bank is a scratchpad memory.

21. The compilation method of claim 15 in which the memory bank is an EEPROM.

22. The compilation method of claim 15 in which the memory bank is flash memory.

23. The compilation method of claim 15 in which the memory bank is NVRAM.

24. The compilation method of claim 14 in which the instruction patterns comprises instruction semantics.

25. The compilation method of claim 24 in which the instruction semantics comprises segments.

26. A computer program product, for vectorizing memory access instructions, the computer program product residing on a computer readable medium for storing computer instructions that, when executed, cause data processing apparatus to:
   convert memory access instructions residing in a source code into intermediary standard formatted memory access instructions;
   generate a plurality of memory access partitions containing corresponding subsets of the intermediary standard formatted memory access instructions, with the plurality of memory access partitions directed to specific memory banks;
   identify matching instruction based on comparisons of pre-defined instruction patterns to the intermediary standard formatted memory access instructions in the plurality of memory access partitions; and
   transform the identified matching instructions to vector memory access instructions, with the transformed vector memory access instructions, when executed, causing a corresponding memory access operation to be performed for a group of memory locations.

27. The computer program product of claim 26, the computer instruction that cause the data processing apparatus to convert comprise computer instructions that cause the data processing apparatus to convert memory access instructions that read or write less than a minimum data access unit to memory access instructions that read or write a multiple of the minimum data access unit.

28. The computer program product of claim 27, the computer instruction that cause the data processing apparatus to convert memory access instructions further comprise computer instructions that cause the data processing apparatus to transform the memory access instructions that read or write the multiple of the minimum data access unit to a format including a base address plus an offset.

29. The computer program product of claim 26, the computer instruction that cause the data processing apparatus to generate partitions comprise computer instructions that cause the data processing apparatus to:

generate a data flow graph containing basic blocks including the intermediary standard formatted memory access instructions; and generate subnodes in the plurality of memory access partitions, the subnodes including intermediary standard formatted memory access instructions directed to the same operation in the memory banks corresponding to the respective memory access partitions.

* * * * *